(12) United States Patent
Winkler

(10) Patent No.: US 10,807,797 B2
(45) Date of Patent: Oct. 20, 2020

(54) STORAGE AND PICKING SYSTEM FOR RETRIEVING HANDLING UNITS

(71) Applicant: SSI Schäfer Automation GmbH (AT), Graz (AT)

(72) Inventor: Max Winkler, Graz (AT)

(73) Assignee: SSI Schäfer Automation GmbH (AT), Graz (AT)

( * ) Notice: Subject to any disclaimer, the term of this patent is extended or adjusted under 35 U.S.C. 154(b) by 105 days.

(21) Appl. No.: 16/165,077

(22) Filed: Oct. 19, 2018

(65) Prior Publication Data

US 2019/0047788 A1 Feb. 14, 2019

Related U.S. Application Data

(63) Continuation of application No. PCT/EP2017/059342, filed on Apr. 20, 2017.

(30) Foreign Application Priority Data

Apr. 20, 2016 (DE) .................. 10 2016 107 258
Apr. 27, 2016 (DE) .................. 10 2016 107 807

(51) Int. Cl.
B65G 1/04 (2006.01)
(52) U.S. Cl.
CPC ......... *B65G 1/0492* (2013.01); *B65G 1/0485* (2013.01)
(58) Field of Classification Search
CPC combination set(s) only.
See application file for complete search history.

(56) References Cited

U.S. PATENT DOCUMENTS 8,276,739 B2 * 10/2012 Bastian, II ............. B65G 1/026
198/347.1
9,452,886 B2 9/2016 Yamashita
(Continued)

FOREIGN PATENT DOCUMENTS

DE 32 21 026 A1 12/1983
DE 296 15 090 U1 11/1996
(Continued)

OTHER PUBLICATIONS

International Search Report for corresponding Patent Application No. PCT/EP2017/059341 dated Jul. 10, 2017.

*Primary Examiner* — Kyle O Logan
(74) *Attorney, Agent, or Firm* — Renner, Otto, Boisselle & Sklar, LLP

(57) ABSTRACT

It is discloses a storage and picking system (10) for retrieving handling units (66) comprising: a rack arrangement (12) including a plurality of racks (14), which are aligned along a longitudinal direction (X) of the system (10) and which comprise several rack planes (54) in a height direction (Y) of the system (10) on top of each other, wherein the rack arrangement (12) comprises in a transversal direction (Z) of the system a central region (32) and two outer regions (30) enclosing the central region (32) in the transversal direction (Z) between each other, and wherein the rack arrangement (12) comprises: a first outer rack (20) positioned in one of the outer regions (30) of the rack arrangement (12) and defining a first retrieval rack (22), from which handling units (66) which are to be retrieved, or articles contained therein, exit the rack arrangement (12) in the transversal direction (Z); at least one central rack (26) positioned in the central region (32) of the rack arrangement (12); a first rack aisle (34) positioned in the transversal direction (Z) between the first outer rack (20) and the central racks (26); and a second rack aisle (34) positioned on a side of the central racks (26) opposite to the first aisle (34) in the transversal direction (Z); a plurality of aisle-exchange units (38), which are respectively configured to move the handling units (66) in the transversal direction (Z) through one of the central racks (26), wherein at least one aisle-exchange unit (38) is assigned to each of the central racks (26), and in particular to each rack plane (54) of the corresponding central rack (26); a plurality of storage and retrieval devices (36) movable horizontally in the rack aisles (34) in the longitudinal direction (X) and respectively comprising a load-handling device (37) configured for transferring the handling units (6) substantially in the transversal direction (Z), wherein at least one of the storage and retrieval devices (36) is provided in each of the rack aisles (34); and at least a first vertical conveyor (40), wherein each of the first vertical conveyors (Continued)

(40) is connected to the first retrieval rack (14) only, or is integrated into the first retrieval rack (22).

20 Claims, 7 Drawing Sheets

(56) References Cited

U.S. PATENT DOCUMENTS

| | | | |
|---|---|---|---|
| 2006/0245861 A1* | 11/2006 | Waltersbacher | B65G 1/0414 414/280 |
| 2010/0036675 A1* | 2/2010 | Schafer | B65G 1/1376 705/1.1 |
| 2016/0060037 A1 | 3/2016 | Razumov | |
| 2017/0233188 A1 | 8/2017 | Tai | |

FOREIGN PATENT DOCUMENTS

| | | |
|---|---|---|
| DE | 101 05 706 A1 | 9/2002 |
| DE | 101 57 121 A1 | 5/2003 |
| DE | 20 2004 012 021 U1 | 1/2006 |
| DE | 20 2006 001 158 U1 | 7/2007 |
| DE | 10 2006 008 932 A1 | 8/2007 |
| DE | 20 2006 003 068 U1 | 8/2007 |
| DE | 10 2006 025 620 A1 | 11/2007 |
| DE | 10 2007 016 453 A1 | 10/2008 |
| DE | 10 2012 107 176 A1 | 2/2014 |
| EP | 1 028 074 A1 | 8/2000 |
| EP | 1 136 395 A2 | 9/2001 |
| EP | 1 813 556 A1 | 8/2007 |
| EP | 2 287 093 A1 | 2/2011 |
| EP | 2 949 605 A1 | 12/2015 |
| JP | S56117902 A | 9/1981 |
| JP | S63197210 U | 12/1988 |
| WO | 2007/134840 A1 | 11/2007 |

* cited by examiner

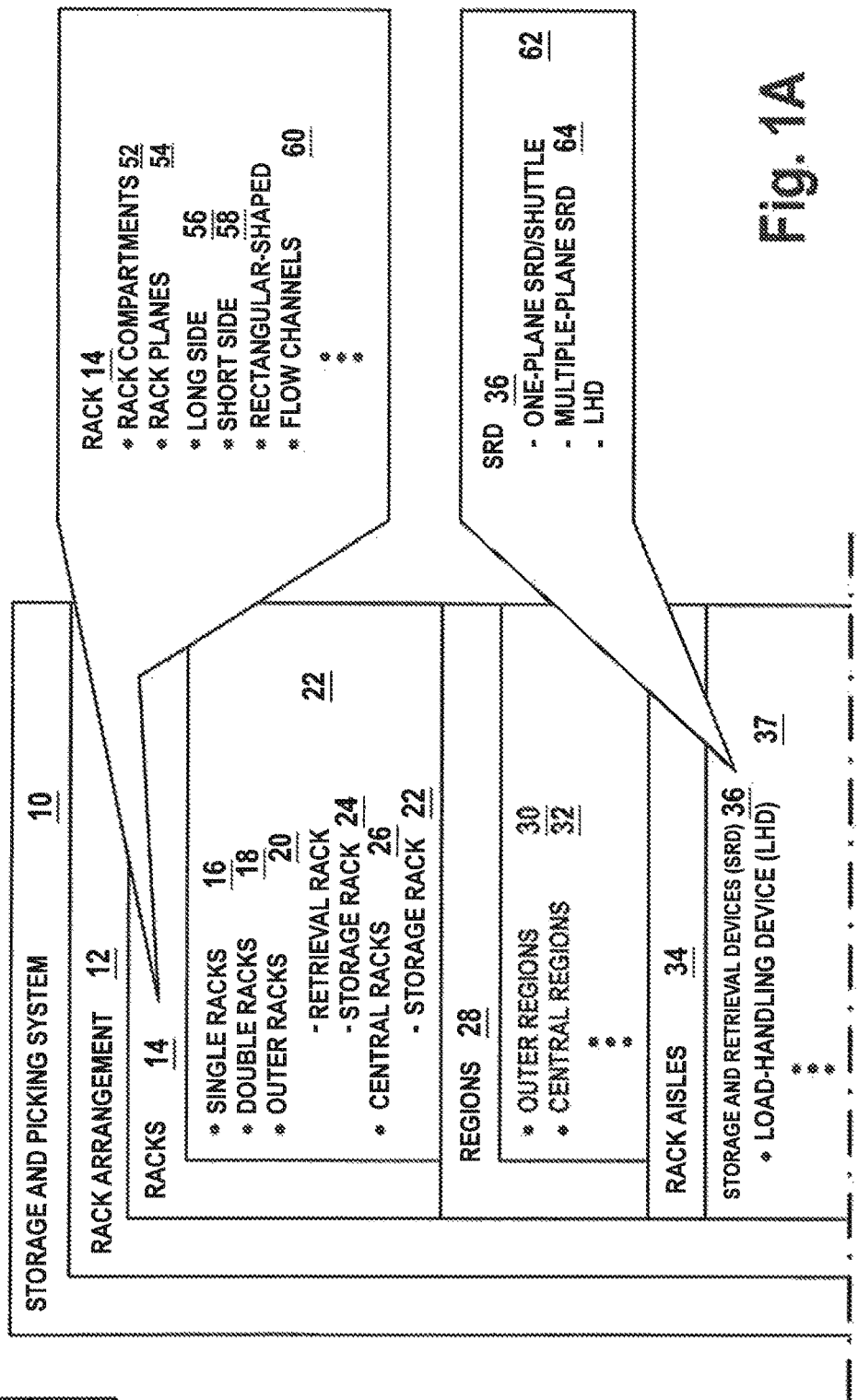

STORAGE AND PICKING SYSTEM FOR RETRIEVING HANDLING UNITS

RELATED APPLICATIONS

This is a continuation application of the co-pending international application WO 2017/182547 A1 (PCT/EP2017/059342) filed on Apr. 20, 2017, which claims priority of the German patent applications DE 10 2016 107 258.3 filed on Apr. 20, 2016, and DE 10 2016 107 807.7 filed on Apr. 27, 2016, each of which is incorporated fully by reference herewith.

The present disclosure relates to storage and picking system for retrieving handling units for the purpose of performing picking processes, wherein the system comprises: a rack arrangement; aisle-exchange units; storage and retrieval devices; and vertical conveyors.

BACKGROUND ART

Conventional storage and picking systems, which are structured similarly, are disclosed in the documents DE 10 2012 107 176 A1, EP 2 287 093 A1, and WO 2007/134840 A2.

DE 20 2004 012 021 U1 discloses a so-called storage-lift system. DE 10 2006 008 932 A1 also discloses a storage-lift system. EP 2 949 605 A1 discloses a shuttle-rack system. DE 101 05 706 A1 discloses a shuttle-rack system. DE 10 2007 016 453 A1 discloses a picking system including a central belt. EP 1 813 556 A1 discloses a storage system.

WO 2007/134840 A2 discloses a conventional rack arrangement where the storage/retrieval of handling units occurs via vertical conveyors which are arranged in a higher number along outer longitudinal sides of the rack arrangement. Thus, the classic storage/retrieval via the front faces, or front sides, of the rack arrangement in the longitudinal direction of the rack arrangement is avoided. Within the rack arrangement an aisle-overlapping exchange of the handling units in the transversal direction of the rack arrangement does not occur.

DE 10 2012 107 176 A1 is an example of the classic approach of the storage/retrieval of the handling units via the front face of the rack arrangement in the longitudinal direction of the rack arrangement. However, within the rack arrangement additional aisle-exchange units are provided allowing an aisle-overlapping exchange of handling units in the transversal direction of the rack arrangement within the rack arrangement, without the need to move the handling units in the longitudinal direction across the front face of the rack arrangement for changing the aisle in the transversal direction outside of the rack arrangement. Vertical conveyors are provided only in a front-sided region of the rack arrangement. Within the rack arrangement no vertical conveyors are provided. Only the aisle-exchange units are integrated into the racks of the rack arrangement.

EP 2 287 093 A1 also discloses a rack arrangement where the storage/retrieval of the handling units into/from the rack arrangement occurs in a transversal direction of the rack arrangement. Classic vertical conveyors arranged at the front face do not exist. The vertical conveyors are integrated into the storage racks of the rack arrangement. However, the vertical conveyors are not only provided in the region of the outer racks of the rack arrangement, but each of the racks, even the racks within the rack arrangement, respectively comprises several vertical conveyors distributed over a length thereof. These rack-integrated vertical conveyors are supplied with handling units via first rail-guided rail vehicles moving in the transversal direction through the rack arrangement (see FIG. 2 of EP '093 A1). An additional second rail vehicle is respectively used in each rack aisle of each rack plane. However, the rack-integrated vertical conveyors are expensive. The fact that for each rack plane always only one single storage and retrieval device is provided reduces the performance and dynamics (double cycles/1000 sites or storage locations; double cycle means one storage and one retrieval in one rack aisle by means of an aisle-specific storage machine within one cycle).

Each of the above-mentioned approaches has the common aim of providing a storage and picking system which can simultaneously fulfill the contrary constraints "reduction of costs" and "increase of performance" optimally. Each of these known approaches has individual advantages and disadvantages. Since the constraints are contrary, these approaches are more or less successful.

Further, it is desirable to eliminate, in terms of material flow, the bottleneck of the pre-zone (of the rack arrangement) with the classic front-sided supply of the rack aisles, wherein the dynamics is nevertheless increased simultaneously without affecting the storage density negatively. In particular, the distributing device (sorters, conveyor circles, etc.) is to be omitted in the pre-zone, which is required with the classic approach for connecting several work stations (picking stations) to several rack aisles, so that each work station can receive storage containers from each rack aisle.

SUMMARY

It is an object to provide an enhanced storage and retrieval system fulfilling the contrary constraints simultaneously in an optimal manner. In particular, the high storage density (number of storage locations/volume unit) such as existing in rack arrangements including a classic front-sided supply of the rack aisles, is to be maintained upon simultaneously omitting the classic pre-zone (sorter and distributing conveyor). Preferably, each work station can be supplied directly from each rack aisle.

According to a first aspect of the disclosure a storage and picking system for retrieving handling units comprises: a rack arrangement having a plurality of racks, which are aligned along a longitudinal direction of the system and which comprise in a height direction of the system several rack planes on top of each other, wherein the rack arrangement comprises in a transversal direction of the system a central region and two outer regions enclosing the central region in the transversal direction between each other, and wherein the rack arrangement comprises: a first outer rack positioned in one of the outer regions of the rack arrangement and defining a first retrieval rack, from which handling units which are to be retrieved, or articles contained therein, exit he rack arrangement in the transversal direction; at least one central rack positioned in the central region of the rack arrangement; a first rack aisle positioned in the transversal direction between the first outer rack and the central racks; and a second rack aisle positioned on a side of the central racks opposite to the first rack aisle in the transversal direction; a plurality of aisle-exchange units, which are respectively configured to move the handling units in the transversal direction through one of the central racks, wherein at least one aisle-exchange unit is assigned to each of the central racks, and in particular to each rack plane of the corresponding central rack; a plurality of storage and retrieval devices movable horizontally in the rack aisles in the longitudinal direction and respectively comprising a load-handling device configured for transferring the handling units substantially in the transversal direction, wherein at least one of the storage and retrieval devices is provided in each of the rack aisles; and at least a first vertical conveyor, wherein each of the first vertical conveyors is connected to the first retrieval rack only, or is integrated into the first retrieval rack. In particular, each first vertical conveyor comprises at a predetermined height a retrieval interface, where retrieved handling units exit the rack arrangement, preferably in the transversal direction.

According to a second aspect a storage and picking system for retrieving handling units comprising: a rack arrangement including a plurality of racks, which are aligned along a longitudinal direction of the system and which comprise several rack planes in a height direction of the system on top of each other, wherein the rack arrangement comprises in a transversal direction of the system a central region and two outer regions enclosing the central region in the transversal direction between each other, and wherein the rack arrangement comprises: a first outer rack positioned in one of the outer regions of the rack arrangement and defining a first retrieval rack, from which handling units which are to be retrieved, or articles contained therein, exit the rack arrangement in the transversal direction; at least one central rack positioned in the central region of the rack arrangement; a first rack aisle positioned in the transversal direction between the first outer rack and the central racks; and a second rack aisle positioned on a side of the central racks opposite to the first aisle in the transversal direction; a plurality of aisle-exchange units, which are respectively configured to move the handling units in the transversal direction through one of the central racks, wherein at least one of the aisle-exchange units is assigned to each of the central racks; a plurality of storage and retrieval devices movable horizontally in the rack aisles in the longitudinal direction and respectively comprising a load-handling device configured for transferring the handling units substantially in the transversal direction, wherein at least one of the storage and retrieval devices is provided in each of the rack aisles; and at least a first vertical conveyor, wherein each of the first vertical conveyors is connected to the first retrieval rack only, or is integrated into the first retrieval rack.

This rack arrangement is highly dynamical at extremely low costs. The dynamics is generally expressed by a quotient which is formed from a "number of storage/retrieval processes" per "storage location". With the present disclosure this quotient is similar to classic shuttle arrangements where each rack aisle is provided at a front side with at least one vertical conveyor for ensuring a sufficient supply of the one-plane storage and retrieval devices (shuttles), one of which is respectively provided on each rack plane in each rack aisle.

Retrieval of the handling units is performed substantially transversal to the rack aisles. The corresponding movements in the transversal direction are performed by the storage and retrieval devices and the aisle-exchange units. Elevators, lifting devices, or vertical conveyors are merely provided in the outer region of the rack arrangement so that they are freely accessible for maintenance purposes. An overall number of the vertical conveyors is smaller in comparison to the conventional concepts because less vertical conveyors are required. Preferably, vertical conveyors are not provided in the interior of the rack arrangement.

Storage density of the rack arrangement (handling unit/ volume unit) is high, in particular because little storage space is consumed by the vertical conveyors. Neither the central racks nor the rack aisles are needed for positioning the vertical conveyors.

Relative simple mechanical components (elevators, shuttles, etc.) are utilized, and the advantages of a three dimensional storage/retrieval concept can be realized nevertheless, where the vertical conveyors are responsible for the vertical movements, the storage and retrieval devices are responsible for the horizontal movements in the longitudinal direction of the aisles, and the aisle-exchange units (in combination with the storage and retrieval device upon storage/retrieval) are responsible for the horizontal movements of the handling units in the transversal direction through the racks. All this is achieved during an optimal utilization of volume.

Preferably, at least two of the storage and retrieval devices, which cannot pass each other in the longitudinal direction, are provided in the first rack aisle.

These storage and retrieval devices ensure that in the immediate region of the retrieval elevators (vertical conveyors) sufficient dynamics is provided. The closer one gets to the retrieval elevators, the more flexible one can react to requirements (transport orders) for bringing a handling unit as fast as possible from a starting point to a destination point. The storage and retrieval devices can be controlled technically in a simple manner because they preferably serve fixedly defined regions within the rack aisle. Complex controlling processes such as moving the load-handling devices, while they pass each other, to a suitable height do not exist. The storage and retrieval devices can also move in a free-of region manner within the aisle, wherein in this case preferably collision-avoidance zones are defined which are anchored in the respective storage and retrieval device.

Another advantage is to be seen in that the central racks only comprise rack compartments and/or aisle-exchange units.

In this way accessibility and ease of maintenance of the vertical conveyors are ensured, which in this case are only positioned in regions of the rack arrangement accessible from the outside.

With a particular embodiment the aisle-exchange units are integrated into the central racks.

In this case the aisle-exchange units are of the "rack-integrated" type. The handling units cross the central racks exclusively by means of the rack-integrated aisle-exchange units.

"Passing through" of the handling units by means of the load-handling devices of the storage and retrieval devices is not carried out in this case. Rack compartments, which are opposite to each other in the transversal direction, can be formed separately within the central racks. Single racks can be built up back-to-back for forming double racks, which in turn can be utilized as central racks.

In particular, each of the storage and retrieval devices is a one-plane storage and retrieval device. In each of the rack aisles at least of these one-plane storage and retrieval devices can be provided at each rack plane.

The utilization of shuttles allows reacting extremely flexible to transport orders. In each rack aisle at least one of the storage and retrieval devices is provided at each rack plane so that waiting times are reduced.

Each vertical conveyor can have assigned a "dedicated" storage and retrieval device so that congestions do not occur in the region of the vertical conveyors. The vertical conveyors are immediately supplied with the handling units and do not need to wait until one of the storage and retrieval devices is free, which just supplies one of the other vertical conveyors in the same aisle.

With a particular embodiment the rack arrangement further comprises at least one third rack aisle, wherein each of the third rack aisles is positioned in the transversal direction between two of the central racks, which are arranged in the transversal direction adjacent and distanced to each other.

Here, scalability expresses. The third rack aisle simplifies an ABC distribution of an assortment of articles across the racks additionally. The closer one gets to the retrieval side, the higher the access-frequency categories of the handling units stored there should be. This means, for example, that articles of type A are stored spatially close to the vertical conveyors, whereas articles of type C are stored spatially further away, in particular in the transversal direction. Articles of type B can be stored in the central regions of the rack arrangement.

In general, an ABC distribution of the handling units can be mapped well in accordance with the above-described pattern to the spatial structure of the rack arrangement.

Further, it is an advantage if the rack arrangement comprises a second outer rack, which is arranged in the other of the outer regions in the transversal direction opposite to the first outer rack and which defines a second retrieval rack, from which the handling units, or the articles contained therein, exit the rack arrangement in the transversal direction.

Due to this aliasing of the structure along a longitudinal axis of the system retrieval capacity can be increased without the need to refuse the above-described advantages.

At the same time, it is generally helpful if a storage-and-retrieval-device density increases, preferably steadily, in a retrieval direction.

In this manner sufficient dynamics is ensured the closer one gets to the vertical conveyors.

In particular, an aisle-exchange-unit density should increase, preferably steadily, in a retrieval direction.

Also, it is also possible that the rack compartments as well as the load-handling devices of the storage and retrieval devices are configured for multiple-deep storage of the handling units.

With a particular embodiment the system further comprises a control device controlling a material flow of handling units to be retrieved so that handling units to be retrieved are moved substantially along the transversal direction through the rack arrangement to one of the retrieval interfaces by: retrieving one handling unit to be retrieved by one of the storage and retrieval devices from one of the rack compartments and subsequently delivering the same to one of the aisle-exchange units or to one of the vertical conveyors; moving the delivered handling unit from the one of the aisle-exchange units through the corresponding central rack for being retrieved by another one of the storage and retrieval devices and for being delivered to one of the vertical conveyors or another one of the aisle-exchange units in another one of the central racks; and conveying, by the one of the vertical conveyors, the delivered handling unit vertically to a retrieval interface thereof; and so that the handling units to be retrieved are moved substantially in the transversal direction through the rack arrangement for exiting the rack arrangement via the retrieval racks.

BRIEF DESCRIPTION OF THE DRAWINGS

It is clear that the above-mentioned and hereinafter still to be explained features cannot only be used in the respectively given combination but also in other combinations or alone without departing from the scope of the present disclosure.

Examples of the disclosure are shown in the figures and will be explained in more detail in the following description, wherein.

PREFERRED EMBODIMENTS

Figure 1B:
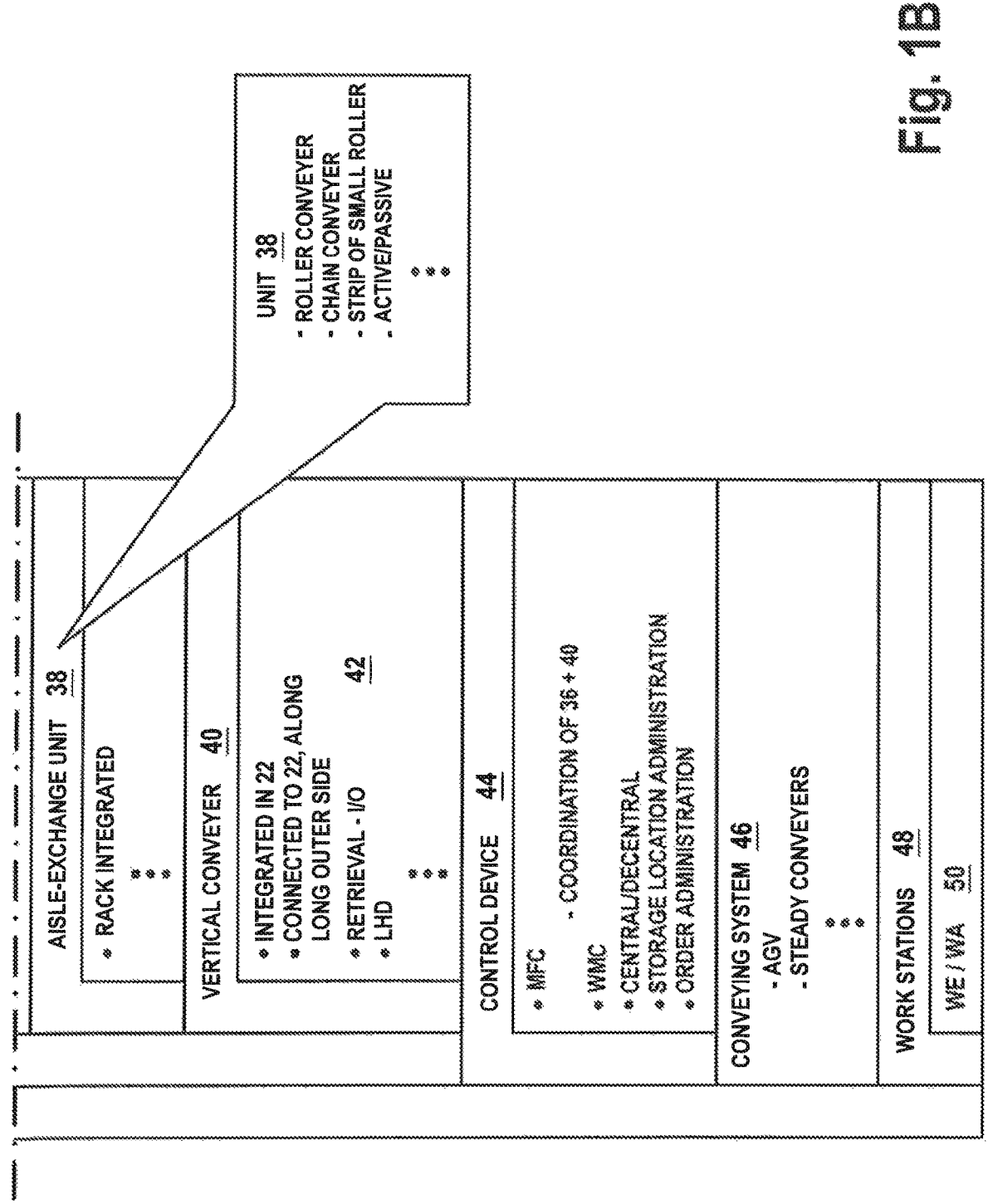
FIG. 1 shows a structural diagram of storage and picking system.

In the following description similar elements, components, parts, and features will be provided with similar reference numerals, wherein the concerned disclosures can be transferred roughly to look-like elements, components, parts, and features having the similar reference numerals. Orientation and position information such as "top", "bottom", "lateral", "vertical", "horizontal", "outer", "inner", "central", "longitudinal", "transversal" and the like relate to the immediately described figure(s), and are to be transferred roughly, in case of a change of orientation or position, to the new orientation or position.

Further, it is to be considered that direction information and orientations are taken as basis which follows the typical designations basically used in the field of (intra) logistics. Consequently, longitudinal direction is designated by "X", transversal direction is designated by "Z", and height direction is designated by "Y". A correspondingly (e.g., Cartesian) coordinate system XYZ can be taken exemplarily from FIG. 1.

In the following to-be-picked goods (i.e. articles, goods, cases, piece goods, etc.) are stored in a warehouse typically in terms of so-called (stock) keeping units ("SKU"). These keeping units will also be designated as "handling units 66" in the following, which are handled with or without load carriers (containers, trays, cartons, etc.).

FIG. 1 shows a non-limiting overview of components and elements, from which a storage and picking system (hereinafter also briefly designated as "system") 10 can be built up.

A core element of the system 10 is a rack arrangement 12. The rack arrangement 12 comprises racks 14, which can be implemented exemplarily in terms of single racks 16, double racks 18, outer racks 20, and central racks 26. The outer racks 20 can be retrieval racks 22 and/or storage racks 24. The central racks 26 typically are storage racks 24 only, i.e. are only used for storage purposes. Each of the racks 14 is exemplarily oriented along a longitudinal direction X of the system as shown, for example, in FIG. 2. This means that a length of the racks extends parallel to the longitudinal direction X, and a width of the racks 14 extends parallel to the transversal direction Z, while the racks 14 extend parallel to the vertical height direction Y. It is clear that the racks 14 may be orientated along the transversal direction Z, or along another arbitrary direction.

The rack arrangement 12 further includes clearly defined regions 28 (areas or spaces), in which the racks 14 are arranged or positioned and which are arranged functionally separated from other regions (e.g., from the picking region, shipping region, etc.). One or more outer regions 30 as well as one or more central regions 32 exist, where the racks 14 are positioned.

In addition, the rack arrangement 12 includes rack aisles 34 arranged and defined between the racks 14. In the rack aisles 34 storage and retrieval devices (SRD) 36 are provided. The rack aisles 34 extend parallel to the racks 14, i.e. parallel to the longitudinal direction X. The rack aisles 34 are defined between such racks 14 arranged distanced to each other in the transversal direction Z, and thus are not in contact with each other and stand back-to-back relative to each other.

The storage and retrieval devices 36 are movable. The storage and retrieval devices 36 are equipped with a drive (not described and shown in more detail here) allowing moving substantially in the longitudinal direction X within the rack aisles 34. The storage and retrieval devices 36 are further respectively provided with a load-handling device (LHD) 37 for transferring, or moving, goods (e.g., the handling units 66) substantially in the transversal direction Z. A corresponding transfer occurs in the direction Z between the SRD 36, the racks 14, and the vertical conveyors 40, which will be described in more detail below. The LHD 37 can perform, if necessary during transfer of the goods in the transversal direction Z, also a lift in the height direction Y. Typically, in this case, the corresponding storage and retrieval device 36 is provided with a mast or the like, along which the LHD 37 is vertically movable. This depends on the type of the LHD 37. In general, however, the LHD 37 performs substantially a transfer of the goods in the transversal direction Z. One-plane storage and retrieval devices, i.e. shuttles, 62 which are preferably used perform the transfers in the transversal direction Z exclusively.

Finally, the rack arrangement 12 includes at least one aisle-exchange unit 38, wherein the aisle-exchange units are formed in particular in a rack-integrated manner. The handling units 66 are exchanged, by means of the aisle-exchange units 38, between adjacent rack aisles 34 as will be described in more detail below. An aisle-exchange unit 38 is a mechanical unit allowing the handling units 66 to get from one of the rack aisles 34 (through a corresponding rack 14) into the immediately adjacent rack aisle 34 for being handled there by a (different) storage and retrieval device 36.

Rack-integrated aisle-exchange units 38 are fixedly installed in the racks 14 so that goods can be moved in the transversal direction Z through the corresponding rack 14. The aisle-exchange units 38 can be implemented by roller conveyors, chain conveyors, strap conveyors, belt conveyors, or the like. The aisle-exchange units 38 can be operated actively (e.g., including a drive) or passively (without a drive, e.g., gravity track).

Further, the rack arrangement 12 includes the vertical conveyors, or elevators, 40. The vertical conveyors 40 are arranged stationary and convey the goods substantially in the vertical direction Y, if speaking of an exchange of the goods by means of the SRD 36 or the LHD 37 thereof. This exchange in turn typically occurs substantially in the transversal direction Z.

The vertical conveyors 40 are assigned to the retrieval racks 22 and are positioned in the immediate vicinity thereof by integrating the vertical conveyors 40 either in the retrieval racks 22, i.e. rack-integrated, or by positioning the same rack-externally and then, however, connecting the same to the corresponding retrieval rack 22 (physically and in terms of material flow). In this case, the rack-external vertical conveyors 40 are positioned along long (outer) sides 56 of the retrieval racks 22, and are connected to the retrieval rack conveyor 22 by means of conveying devices.

Each of the vertical conveyors 40 comprises at least one retrieval interface 42 at a predetermined height.

The system 10 can further comprise a control device 44, additional conveying devices 46 (external to the rack arrangement), work stations 48, a goods receipt (WE)/goods issue (WA) 50, and other functional units typically provided in conventional storage and picking systems. Communication between the different elements and components is conducted via bus systems and/or in a wireless manner.

The control device 44 can take over several functions such as the one of a material-flow computer (MFC), a warehouse-management computer (WMC), an administration of storage locations, an order administration, and the like. The control device 44 can be implemented centrally and/or in a decentralized manner. The control device 44 takes care that to-be-retrieved handling units 66 are moved substantially in the transversal direction Z through the rack arrangement 12 for exiting the rack arrangement 12 via the retrieval interfaces 42 (in the transversal direction, i.e. not via the short front sides).

The conveying system, or the conveying device, 46 can be realized by steady conveyors, autonomously movable vehicles, and driverless transport systems or the like.

The work stations 48 can include packing stations, palletizing stations, depalletizing stations, and the like. The goods issue 50 can include a shipping station.

Each of the racks 14 comprises a plurality of rack compartments 52 arranged in the longitudinal direction X next to each other and in the height direction Y on top of each other in terms of rack planes. The compartments 52 extend, with regard to a depth thereof, parallel to the transversal direction Z. The compartments 56 can be configured for single-deep or multiple-deep storage of the handling units 66.

The racks 14 typically have a rectangular shape and are formed by two opposite long sides 56 and two opposite short (face) sides 58. The long sides 56 are typically aligned parallel to the longitudinal direction X. The short sides 58 are typically aligned parallel to the transversal direction Z. The racks 14 can further comprise flow channels 60 which in turn are oriented along the transversal direction Z.

The SRD 36 can be implemented in terms of one-plane storage and retrieval devices 62 or in terms of multiple-plane storage and retrieval devices 64. One-plane SRD 62 are also called "shuttles". One-plane SRD 62 and multiple-plane SRD 64 are different in that the respective SRD 36 can serve either only one single rack plane 54 or several rack planes 54 arranged on top of each other.

Figure 2:
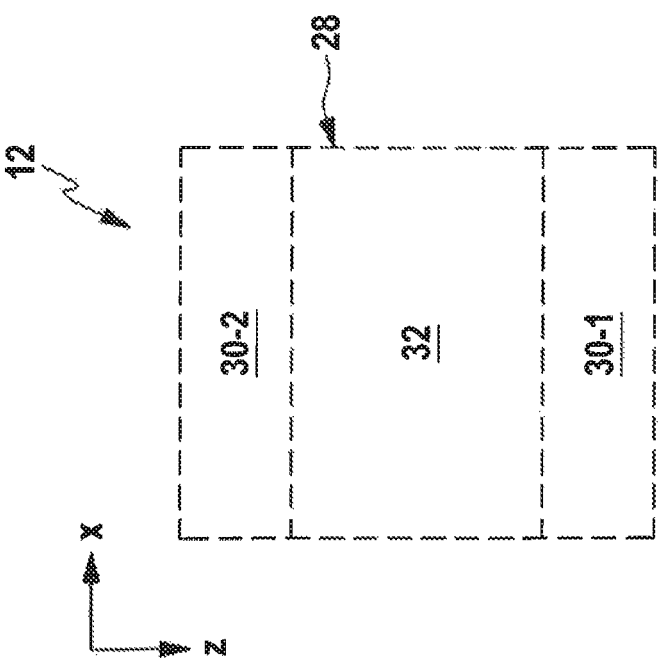
FIG. 2 shows a top view of an exemplary region where the system is positioned.

FIG. 2 shows a top view of an overall area, or an (overall) region 28, in which the rack arrangement 12 can be positioned. The region 28 is surrounded by a dashed line in FIG. 2. The region 28 is exemplarily divided along the transversal direction Z into a first outer region 30-1 extending in the longitudinal direction, a central region 32, and a second outer region 30-2. The division could also be done along the longitudinal direction X or any other arbitrary direction. The outer region 30 may completely enclose the central, or inner, region 32.

Figure 3:
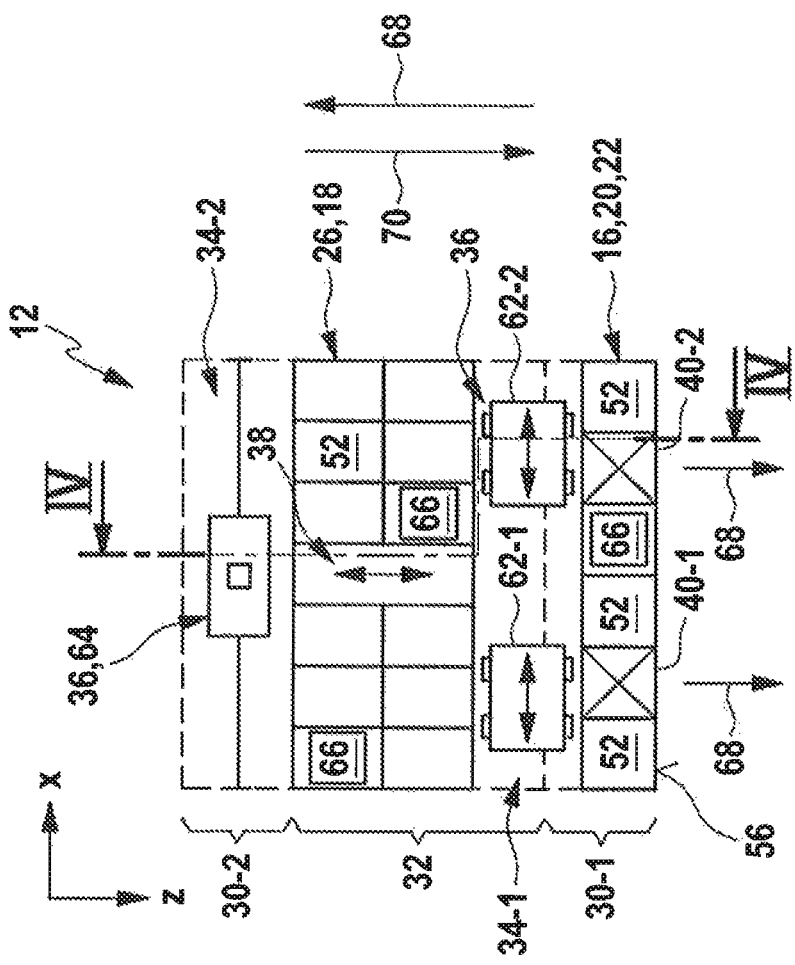
FIG. 3 shows a top view of the region of FIG. 2 including corresponding components and elements of the system.

FIG. 3 shows a top view of the region 28 of FIG. 2 including further components of the rack arrangement 12, namely including the racks 14, the rack aisles 34, the storage and retrieval devices 36, the vertical conveyors 40, and a (single) aisle-exchange unit 38. In the first outer region 30-1, for example, one single rack 16 is arranged. This single rack 16 in this case is the only outer rack 20 of the rack arrangement 12. This single rack 16 functionally is thus also the only retrieval rack 22, because only outer racks 16 can be retrieval racks 22. The handling units 66, which are stored in the rack compartments 52, are moved in terms of material flow by means of the SRD 36 and, if necessary, by means of the aisle-exchange unit 38 to the vertical conveyors 40-1 and/or 40-2 for exiting the rack arrangement 12 in the transversal direction Z, as indicated by arrows 68. The retrieval rack 22 is generally characterized by its vertical conveyors 40, which are typically not comprised by the central racks 26.

The vertical conveyors 40-1 and 40-2 are here exemplarily integrated into the retrieval rack 22. The vertical conveyors 40-1 and 40-2 are, for example, fixedly installed into a rack construction (not shown in more detail) for transporting the handling units 66 substantially in the vertical direction Y (i.e., perpendicular to the drawing plane). It is clear that the vertical conveyors 40 can be equipped with corresponding load-handling devices, which are not shown and described in more detail here. The load-handling devices are preferably configured to exchange actively the handling units 66 with the SRD 36 in the transversal direction Z, in particular during storage phases. These LHD are preferably configured for lifting in the vertical direction Y.

In general, several vertical conveyors 40 are assigned to each retrieval rack 22 by arranging the corresponding vertical conveyors 40 along the long side 56 of the retrieval rack 22 in a distributed manner. Also, the vertical conveyors 40 can be positioned directly adjacent to each other in the longitudinal direction X. In FIG. 3 the vertical conveyors 40 are directly integrated into the retrieval rack 22. Alternatively and additionally, the vertical conveyors 40 can also be coupled from the outside to the long side 56 of the retrieval rack 22, by mounting the same, for example, from the outside to the retrieval rack 22 (not shown in FIG. 3).

A first rack aisle 34-1 is defined between the retrieval rack 22 and one central rack 26. The central rack 26 is a double rack 18 which is obtained, for example, by positioning two single racks 16 back-to-back. The first rack aisle 34-1 is arranged in the transversal direction Z between the central rack 26 and the retrieval rack 22 of FIG. 3.

A second rack aisle 34-2 is arranged on an opposite side of the central rack 26, which is opposite to the side of the central rack 26 to which the first rack aisle 34-1 is directly adjacent. The first and second rack aisles 34-1 and 34-2 are directly-adjacent rack aisles 34.

In the first rack aisle 34-1 two SRD 36 are provided exemplarily. Still more SRD 36 may be provided there. In FIG. 3, for example, a first one-plane SRD 62-1 and a second one-plane SRD 62-2 are provided which are operated simultaneously in the first rack aisle 34-1. The one-plane SRD 62-1 and 62-2 are typically adapted so that they cannot pass each other in the longitudinal direction X. It is clear that, if in the first rack aisle 34-1 one-plane storage and retrieval devices 62 are used, respectively several one-plane storage and retrieval devices 62 are provided at each rack plane 54 (not shown), since the one-plane storage and retrieval devices themselves are not provided with a lift.

In the second rack aisle 34-2 a further SRD 36 is provided. In FIG. 3, for example, one (single) multiple-plane SRD 64 is provided which can reach each of the rack planes 54 of the central rack 26 of FIG. 3 in the height direction Y. Thus, in the second rack aisle 34-2 only one single SRD 36 is provided in total, whereas at least ten one-plane SRD 62 are provided in the first rack aisle 34-1, if the retrieval rack 22 and the central rack 26 respectively comprise, for example, five rack planes 54 (distanced equal vertically).

The central rack 26 of FIG. 3 is equipped with at least one aisle-exchange unit 38 (per rack plane 54) allowing (during retrieval) an exchange of the handling units 66 in the transversal direction Z through the central rack 26 between the SRD 64 of the second rack aisle 34-2 and the SRD 62 of the first rack aisle 34-1. In the example of FIG. 3 one aisle-exchange unit 38 is provided at each of the (non-depicted) rack planes 54, because storage and retrieval devices 36 of the one-plane storage and retrieval device 62 type are used in the first rack aisle 34-1. Thus, it is ensured that each of the one-plane storage and retrieval devices 62 can receive (and later distributed to the vertical conveyors 40) in the first rack aisle 34-1 handling units 66 from the storage and retrieval device 64 of the second rack aisle 34-2. The structure of the rack arrangement 12 of FIG. 3 in the vertical direction Y will be explained hereinafter with reference to FIG. 4 in more detail.

The aisle-exchange units 38 are preferably active units 38, i.e. the aisle-exchange units 38 are driven, for allowing an exchange of the handling units 66 in an automated manner in the longitudinal direction X between the adjacent rack aisles 34-1 and 34-2. It is clear that the aisle-exchange units 38 can also be formed passively, such as by non-driven strips of small rollers (not depicted), where the movement of the handling units 66 through the rack 26 can be performed by means of pulses by the SRD 36 or by means of gravity.

The aisle-exchange units 38 extend (in the transversal direction Z) preferably across an overall width of the corresponding central rack 26, whereas the rack compartments 52 of the central rack 26 of FIG. 3, being directly opposite in the transversal direction Z, are exemplarily formed in a manner physically separated from each other so that passing through the handling units 66 in the transversal direction Z can only be achieved at the aisle-exchange units 38. It is clear that, dependent on the embodiment of the racks 14, the storage and retrieval devices 36 can take over the function of the aisle-exchange units 38 if the LHD 37 of the SRD 36 are formed correspondingly. This means that the LHD 37 of the SRD 36 are configured, in this case, so that the handling units 66 can be moved from one of the sides 56 of the central rack 26 through the rack 26 to the side 56 oppositely arranged in the transversal direction Z.

Figure 4:
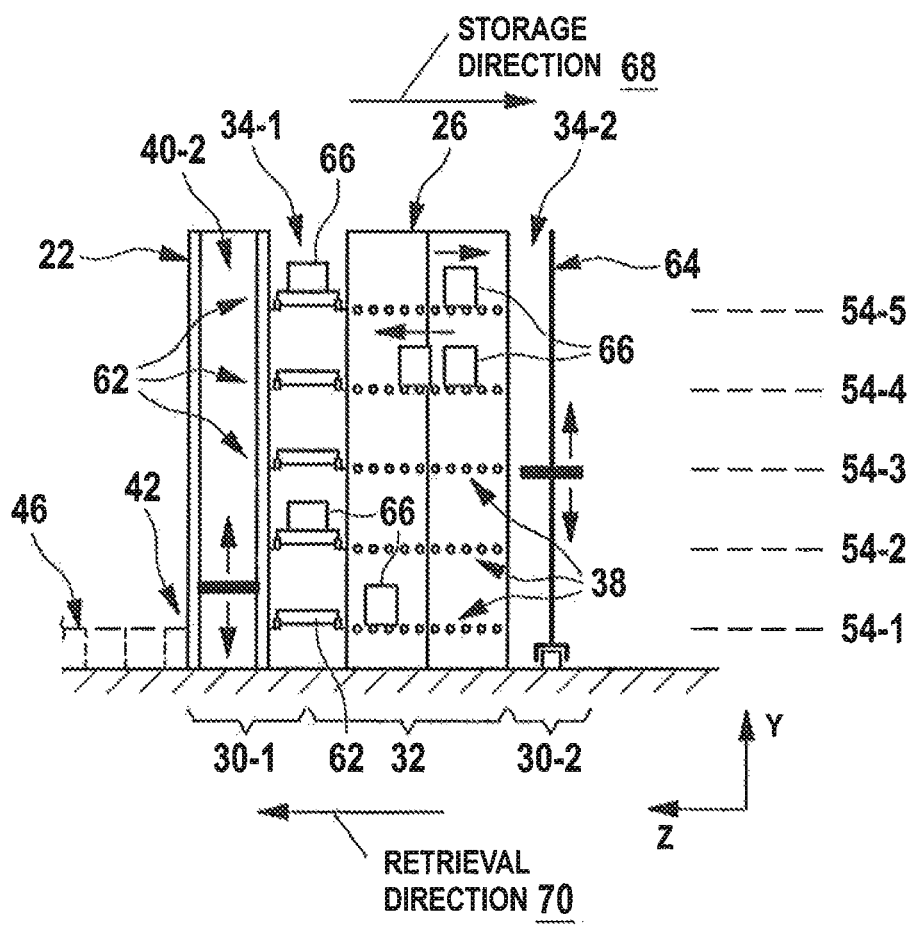
FIG. 4 shows a sectional view along the line IV-IV in FIG. 3.

FIG. 4 shows a lateral sectional view of the rack arrangement 12 of FIG. 3 along the line IV-IV in FIG. 3. The section extends through both the central rack 26 at the height of the aisle-exchange units 38 and the retrieval rack 22 at the height of the vertical conveyors 40-2. The FIG. 4 will be described from left to right.

In a first outer region 30-1 the retrieval device 22 is positioned, which comprises the rack-integrated vertical conveyors 40, wherein the vertical conveyor 40-2 thereof is shown in FIG. 4. The vertical conveyor 40-2 includes a load-handling device, which is not designated in more detail and which is movable upwards and downwards along rack-integrated guiding devices, which are not designated in more detail, in the vertical direction Y within the retrieval rack 22, as indicated by dark little arrows. The load-handling device of the vertical conveyor 40-2 is typically provided with a conveying unit, which is not shown and designated in more detail in FIG. 4, for delivering the handling units 66, which are delivered by the shuttles 62 in the horizontal transversal direction Z, at the retrieval interface 42 actively in the horizontal direction Z to an (external) conveying system 46, which is indicated in FIG. 4 by means of a dashed line at bottom level and which in this case does not belong to the rack arrangement 12. Thus, the retrieval interface 42 is defined, for example, at the height of a first (lowermost) rack plane 54-1. It is clear that the retrieval interface 42 can be defined in each arbitrary height. Further, it is clear that each of the vertical conveyors 40 can also comprise (including associated conveying systems 46), several retrieval interfaces 42 arranged on top of each other.

Since the storage and retrieval devices 36 are implemented in the first rack aisle 34-1, which overlaps the first outer region 30-1 and the central region 32, by one-plane SRD, or shuttles, 62, shuttles 62 are arranged at each of the five rack planes 54-1 to 54-5, which are exemplarily shown here. Each of the shuttles 62 comprises a load-handling device 37 configured to retrieve the handling units 66 from the racks 14 or the aisle-exchange units 38, and to deliver the same to the vertical conveyors 40 (or to other rack compartments 52 in the racks 22 and 26).

The central rack 26 is arranged in the central region 32. In FIG. 4 five aisle-exchange units 38 are shown, which are arranged vertically on top of each other at the height of the rack planes 54 and which are here exemplarily implemented in terms of roller conveyors not being designated in more detail. At each of the rack planes 54-1 to 54-5 respectively one aisle-exchange unit 38 is provided. Each of the aisle-exchange units 38 preferably extends across an entire width of the central rack 26 in the transversal direction Z. However, the aisle-exchange units 38 may be shorter so that they are only provided in an inner core region of the actual rack compartments 52. In this case, "normal" rack compartments 52 can be positioned in front of the aisle-exchange units 38.

In FIG. 3 the aisle-exchange units 38 are formed actively, i.e. are driven, for moving one or more of the handling units 66 autonomously in the horizontal transversal direction Z to the left or right. At the fourth rack plane 54-2, for example, two handling units 66 are shown which are moved from the second rack aisle 34-2 towards the first rack aisle 34-1, as indicated by a dark arrow, for being retrieved there by the corresponding shuttle 62 and for being delivered later to one of the vertical conveyors 40. Alternatively, the handling units 66 can be delivered by this shuttle 62, of course, also to a rack compartment 52 (not shown here) of the retrieval rack 22 by moving the shuttle 62 on rails, which are rack-sided mounted and which are not designated in more detail here, horizontally in the longitudinal direction X (i.e., perpendicular to the drawing plane of FIG. 4) to the corresponding rack compartment 52 and subsequently delivering the handling unit 66 to this rack compartment 52 in the transversal direction Z. In these cases, the retrieval rack 22 serves as a buffering rack, for example, if the corresponding vertical conveyor 40 is not yet ready to receive the handling unit 66 because the corresponding vertical conveyor 40 is still occupied by a different transport order.

The aisle-exchange units 38, however, can also be used for storing or re-arranging the handling units 66. In this case, the aisle-exchange units 38 are operated in the inverse direction. In FIG. 4, for example, one single handling unit 66 is moved at the fifth rack plane 54-5 along a storing direction 68 from the first rack aisle 34-1 through the central rack 26 to the second rack aisle 34-2, as indicated by a small dark arrow in the rack plane 54-5. From there this handling unit 66 can be retrieved by the multiple-plane SRD 64 by moving the load-handling device thereof to the height of the fifth rack plane 54-5, in order to receive this handling unit 66 and transfer the same to one of the rack compartments 52 (not shown here) of the central rack 26. The multiple-plane storage and retrieval device 64 is exemplarily rail guided (at the bottom side) and comprises a mast, which is not shown in more detail here and along which the load-handling device, which is not designated in detail here, can move downwards and upwards in the vertical direction Y. Further, it is also clear that the load-handling device of the SRD 64 can also be driven for actively moving the handling units 66 in the horizontal transversal direction Z. The SRD 64 as such can move horizontally in the longitudinal direction X through the second rack aisle 34-2.

Figure 5:
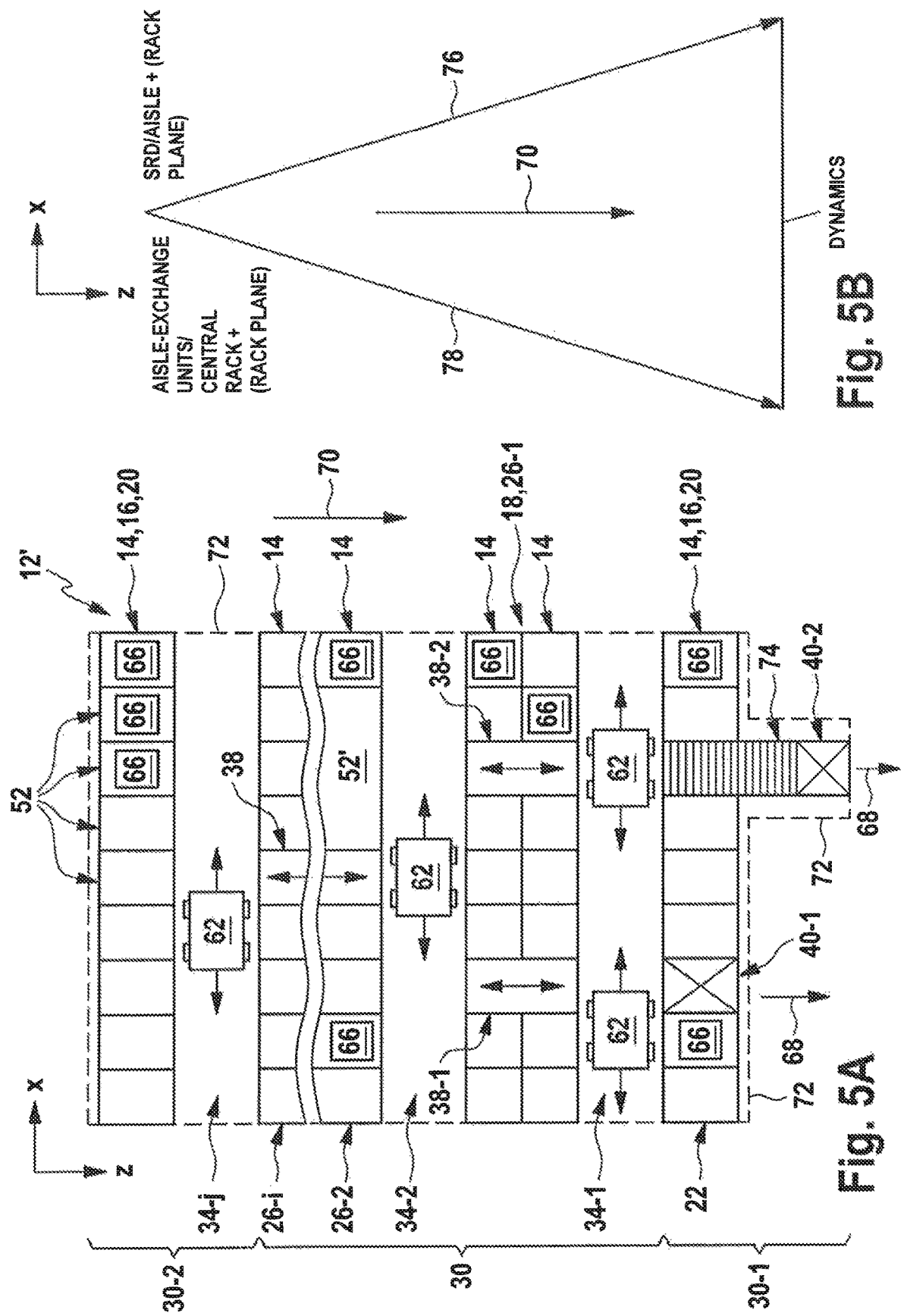
FIG. 5 shows a top view of another embodiment of the system (FIG. 5A) and an illustration of different densities (FIG. 5B) for the system of FIG. 5A.

Further, it is clear that the multiple-plane SRD 64 can be exchanged generally by any other type of SRD 36. In this way the multiple-plane SRD 64 of FIG. 3 and FIG. 4 can be replaced, for example, by five one-plane SRD 62 arranged vertically on top of each other, as already shown for the first rack aisle 34-1. This replacement is particularly useful if additional central racks 26 (not shown) extend at the right-hand side besides the central rack 26 shown in the figure, as will be described in more detail with reference to FIG. 5.

Further, it is clear that even the one-plane SRD 62 in the first rack aisle 34-1 can be replaced by any other type of SRD 36. This in turn influences the vertical distribution, and thus the number, of the aisle-exchange units 38 in the respective central rack 26. The aisle-exchange units 38 are to be distributed in the vertical direction Y such that each of the SRD 36 in directly adjacent rack aisles (here 34-1 and 34-2) has the possibility of receiving handling units 66 from the respective other SRD 36 from the other rack aisle 34.

However, it is particularly preferred to only use one-plane SRD 62 within the rack arrangement 12. In this case, at least one aisle-exchange unit 38 is respectively provided at each rack plane 54 of the central racks 26.

The FIGS. 5A and 5B serve for graphically illustrating different densities, in particular a storage-and-retrieval-device density 76 and an aisle-exchange-unit density 78. FIG. 5A shows a top view of a further embodiment of a rack arrangement 12' structured similarly to the rack arrangement 12 of the FIGS. 3 and 4, but being bigger. FIG. 5B shows a graphical illustration of the different densities 76 and 78 for the FIG. 5A.

In the rack arrangement 12' of FIG. 5A the retrieval, or movement, of the handling units 66 is again conducted, for example, exclusively from top to bottom (cf. orientation of the arrow for the retrieval direction 70), i.e., substantially along the transversal direction Z, because only one (single) retrieval rack 22 is provided in the lower outer region 30-1. The outer rack 20 in the upper outer region 30-2 is not used as a retrieval rack 22, but as a storage rack 24 only, so that vertical conveyors 40 cannot be provided there either. The retrieval rack 22 in the lower outer region 30-1 exemplarily comprises two vertical conveyors 40-1 and 40-2, wherein the vertical conveyor 40-1 is formed in a rack-integrated manner and the vertical conveyor 40-2 is positioned outside the retrieval rack 22, i.e. rack-external, but still within the outer region 30-1, as indicated by the course of a dashed line 72 embodying the outer rim of the rack arrangement 12'. The rack-external vertical conveyor 40-2 is connected (horizontally transversal) via a conveying device 74 (here, for example, a roller conveyor) to the retrieval device 22 (physically and in terms of material flow). It is clear that the conveying device 74 is provided at each rack plane 54 of the retrieval rack 22, in particular in case if in the first rack aisle 34-1 only one-plane SRD 62 is used. Further, it is clear that the handling unit 66 can exit the rack-external vertical conveyor 40-2 not only in the transversal direction Z (see arrow 68) but alternatively and/or additionally also in the longitudinal direction X. The same applies generally for the vertical conveyors 40, even for the rack-integrated vertical conveyor 40-1 in FIG. 5A, by guiding, for example, a rack-integrated conveying system to the front side of the rack arrangement 12'. In which direction the handling units 66 actually exit the vertical conveyors 40 can be selected arbitrarily. The material flow within the rack arrangement 12, however, is generally performed substantially along the transversal direction Z.

The rack arrangement 12' of FIG. 5A comprises several central racks 26. In FIG. 5A a first central rack 26-1, a second central rack 26-2, as well as a further central rack 26-*i* is shown, wherein the index "i" can take each arbitrary number being greater than 2. Further, in FIG. 5A a first rack aisle 34-1, a second rack aisle 34-2, as well as an j-th rack aisle 34-*j* (j=i+1) are shown. In rack aisles 34 of FIG. 5A, for example, one-plane storage and retrieval devices 62 are used only. This means that in each rack aisle 34 at each one of the corresponding rack planes 54 (not shown) one-plane storage and retrieval devices 62 are provided. In this way it is ensured that each rack compartment 52 at each rack plane 54 can be served. It is clear that the rack compartments 52 can have different dimensions, as exemplarily indicated for the wider rack compartment 52' in the second central rack 26-2.

Generally, it applies that both the storage-and-retrieval-device density 76 and the aisle-exchange-unit density 78 increase in the retrieval direction 70 (preferably steadily), as indicated in the chart of FIG. 5B. With other words this means that the more storage and retrieval devices 36 are used for each rack aisle 34, and dependent from the used type of the storage and retrieval devices 36 also for each rack plane 54, the closer one gets to the retrieval rack 22. The same applies for the aisle-exchange units 38 which is expressed by the aisle-exchange-unit density 78.

In the rack arrangement of FIG. 5A more one-plane storage and retrieval devices 62 are provided in the first rack aisle 34-1 (here, for example, two for each rack plane) than in the second rack aisle 34-2 (one one-plane SRD 62 for each rack plane) and in the j-th rack aisle 34-*j* (one shuttle 62 for each rack plane 54). In the first central rack 26-1 (for each rack plane 54) two aisle-exchange units 38-1 and 38-2 are provided. In the second central rack 26-2 and in the i-th central rack 26-*i*, for example, only one single aisle-exchange unit 38 is provided only.

A geometric distribution, or positioning, of the aisle-exchange units 38 in the longitudinal direction X of the system 10, or the rack arrangement 12, is becoming preferably wider and wider in the transversal direction Z the closer one gets to the retrieval rack 22. This is expressed in FIG. 5B by the base of the shown triangle becoming wider in the retrieval direction 70. Preferably, the aisle-exchange units 38 are distributed symmetrically relative to a central axis (not shown) extending parallel to the transversal direction Z throughout the rack arrangement 12, or 12'. Similar is true for the storage and retrieval devices 36 and the typical moving zones thereof, which are not depicted in more detail here.

FIG. 5A also shows that preferably for each storage and retrieval device 36 respectively at least one aisle-exchange unit 38 exists. In this way, a dedicated aisle-exchange unit 38-1 or 38-2 in the first central rack 26-1 is assigned to each of the one-plane storage and retrieval devices 62 in the first rack aisle 34-1. One aisle-exchange unit 38 in the second central rack 26-2 is assigned to the one-plane storage and retrieval device 62 in the rack aisle 34-2. It is clear that the number of aisle-exchange units 38 preferably behave proportional to the number of the storage and retrieval devices 36 provided in the assigned rack aisle 34.

The same is true for the number of the vertical conveyors 40 in relation to the assigned storage and retrieval devices 36 in the directly adjacent rack aisle 34, which is represented in FIG. 5A for the vertical conveyors 40-1 and 40-2 by the first rack aisle 34-1. Preferably, at least one (dedicated) vertical conveyor 40 is assigned to each one-plane storage and retrieval device 62 in the first rack aisle 34-1. Of course, even more aisle-exchange units 38 and/or vertical conveyors 40 can be assigned to each of the storage and retrieval devices 36, wherein these aisle-exchange units 38 and these vertical conveyors 40 in this case do actually physically exist and are not assigned in terms of data only.

Figure 6:
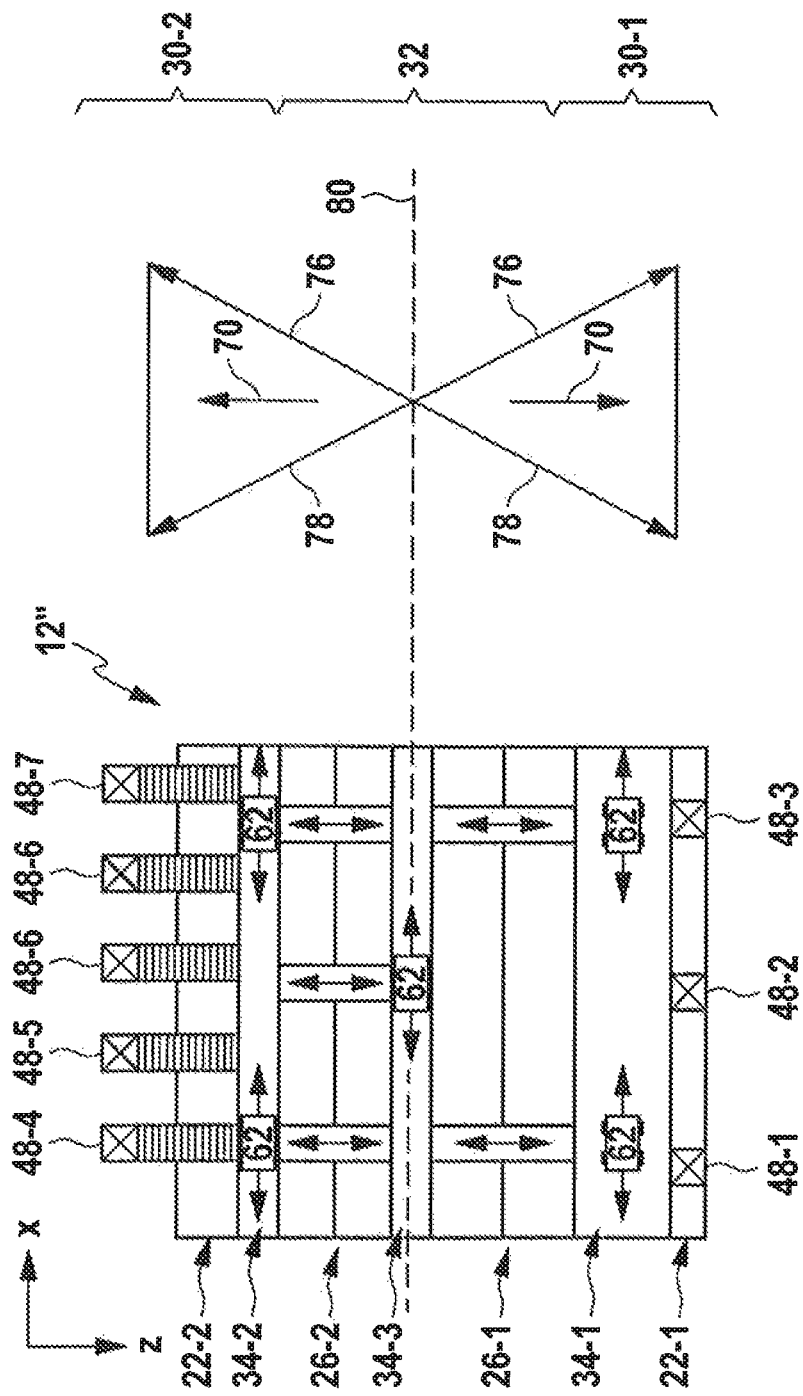
FIG. 6 shows a top view of still another embodiment of the system (FIG. 6A) as well as a corresponding distribution of density (FIG. 6B)

FIG. 6A shows a top view of a further embodiment of a rack arrangement 12". FIG. 6B illustrates analogously to FIG. 5B the corresponding densities 76 and 78 for the rack arrangement 12" of FIG. 6A.

The rack arrangement 12" of FIG. 6A is similarly structured like the other rack arrangements 12 and 12'. The rack arrangement 12" substantially distinguishes only in that two retrieval racks 22-1 and 22-2 are provided. Each of the retrieval racks 22-1 and 22-2 is in one of the outer regions 30-1 and 30-2. In the central region 32, for example, two central racks 26-1 and 26-2 are provided, wherein in the first central rack 26-1 two aisle-exchange units 38 are provided being arranged in the longitudinal direction X preferably in a symmetrically distributed manner. The second central rack 26" exemplarily includes three aisle-exchange units 38, which can be arranged also symmetrically distributed in the longitudinal direction X.

In the first rack aisle 34-1 and the second rack aisle 34-2 respectively several SRD 36 (per rack plane 54), in this case for example in terms of one-plane SRD 62, are provided. In the example of FIG. 6A two one-plane SRD 62 are respectively provided exemplarily. A third central rack aisle 34-3 is operated between the two central racks 26-1 and 26-2 respectively by means of one one-plane SRD 62 (per rack plane 54).

The vertical conveyors 40-1 to 40-3 are integrated into the first retrieval rack 22-1. The vertical conveyors 40-4 to 40-7 are coupled from the outside to the second retrieval rack 22-2. Also the vertical conveyors 40 are preferably arranged in the longitudinal direction X in a regularly distributed manner.

The FIG. 6B expresses that the SRD density 76 respectively increases starting from the central axis 80 in the transversal direction Z towards the retrieval racks 22-1 and 22-2. The same applies for the aisle-exchange-unit density 78.

In general, it applies that the central racks 26 preferably do not comprise devices at all for vertically conveying the handling units 66. Of course, it can be necessary in individual cases to even provide in the central racks, or to the central racks 26, a device for vertically conveying. The substantial portion of the material flow in the vertical direction occurs, however, only in the region of the retrieval racks 22. Thus, the central racks substantially comprise the rack compartments 52 as well as the aisle-exchange units 38, whereas the retrieval racks 22 include the vertical conveyors 40.

Further, it is possible to replace the rack compartments 52 in the retrieval racks 22 by flow channels 60 (which are not shown and described in more detail here). Such flow channels 60 allow picking of single articles out of the handling units 66, without the handling units 66 actually leaving the respective rack arrangement 12 (piece picking). It goes without saying that even the handling unit 66 can be picked out of the flow channels 60 (case picking). Typically, the handling units 66 exit the rack arrangement 12 for being transported to the picking stations, palletizing stations, packing stations, or other stations and regions of the system 10, which are not shown here. If the retrieval racks 22 comprise flow channels 60, it is advantageous to arrange further vertical conveyors laterally to one or both front sides of the corresponding rack aisle so that handling units 66, which are arriving from higher rack planes 54, do not need to be moved once again transversally through the entire rack arrangement for reaching the vertical conveyors at the longitudinal sides, where the height in this case is bridged for being moved back subsequently transversal through the rack arrangement at the height of the flow channels towards the flow channels.

Figure 7:
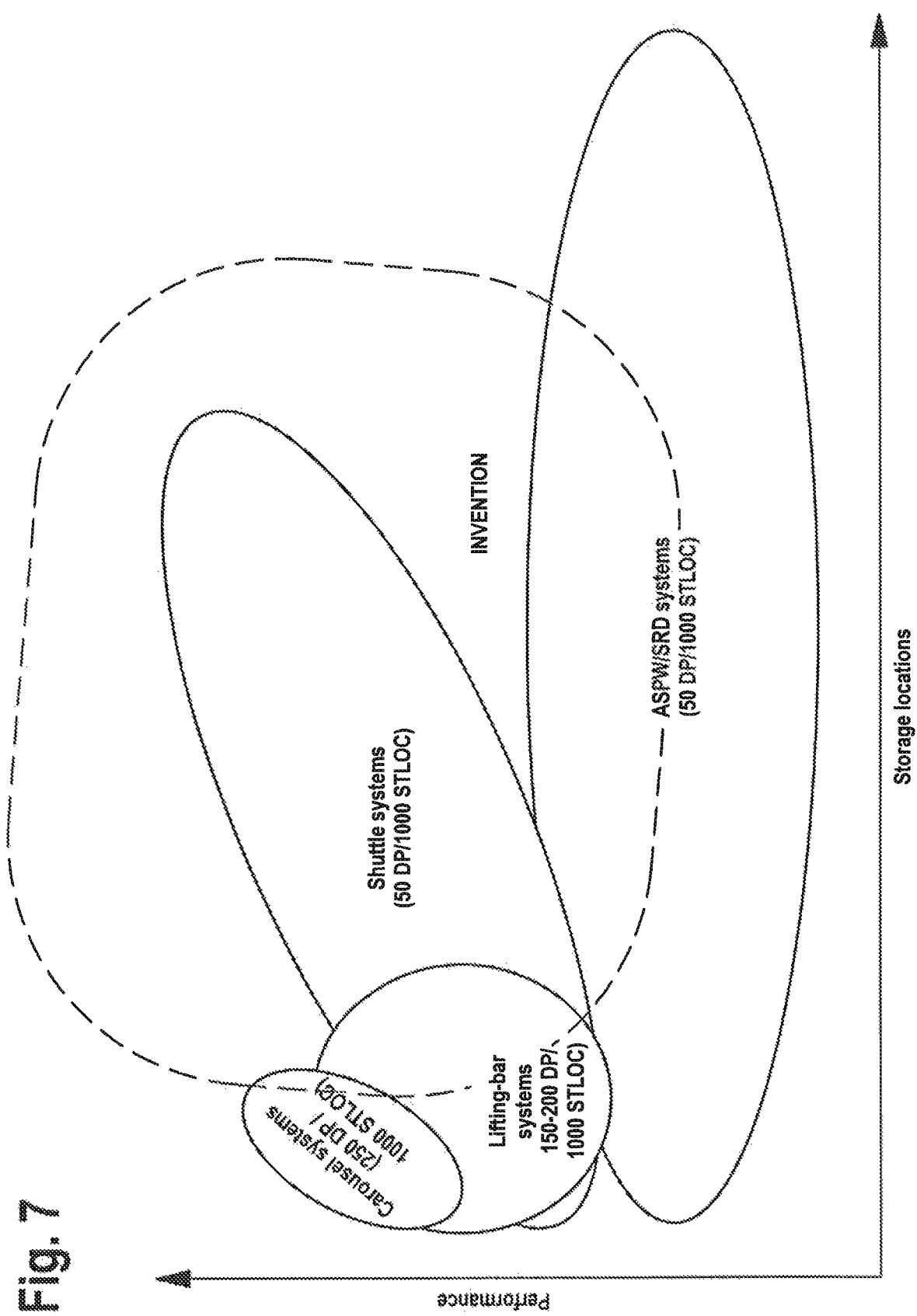
FIG. 7 shows a systematic overview of the efficiency of different storage machines, or storage and retrieval devices, in a small-parts warehouse.

FIG. 7 shows an overview of different combinations of storing machines (i.e., storage and retrieval devices) together with racks, wherein storage capacity (axis X) is depicted against performance (e.g., double cycles) (axis Y). A quotient of these two magnitudes (double cycles/1000 storage locations) represents a measure for dynamics achievable by the respective system.

In particular four classic, or conventional, regions are shown being designated by "ASPW/SRD", "shuttle systems", "lifting bar", and "carousel systems". The (dynamical) region of the present disclosure is designated by "Cuby-3D".

The conventional "ASPW/SRD" region is characterized by a low throughput (e.g., 5 double cycles/1,000 storage locations) across almost the entire width of possible numbers of storage locations. This means that throughput does not change substantially if the number of storage or rack locations changes.

Different is true for the "shuttle system" region. There, the throughput (double cycles) can be increased if number of storage locations increases. Dynamics of, for example, 50 double cycles per 1,000 storage locations can be reached by a classic shuttle system (shuttle at each plane, front-sided vertical conveyors for storage/retrieval at the front side).

The "lifting bar" region is relatively small and characterized by a higher throughput upon less storage locations (150-200 double cycles/1,000 storage locations).

A similar statement applies for the "carousel system" region, which is characterized by an even higher dynamics (250 double cycles/1,000 storage locations) but with a narrower number of storage locations.

The present disclosure may be characterized by the "Cuby-3D" region, which is located in FIG. 7 between the "ASPW/SRD" region and the "shuttle system" region and which partially overlaps the same. The reason for this is to be seen in that, with the present disclosure retrieval is performed in the transversal direction and the two conventional regions are operated with a front-sided retrieval. With the present disclosure each of the vertical conveyors can access each handling unit from each rack aisle. The dynamics can be increased by merely installing more vertical conveyors in the retrieval rack, without increasing the number of the rack aisles. The throughput can be decreased by providing less vertical conveyors (for example, 4 vertical conveyors for rack aisles) than with the classic approach (4 aisles require 4 vertical conveyors). The system of the present disclosure can be scaled differently. Additional rack aisles do not need to be provided for increasing the performance. For example, only an increase of the number of the vertical conveyors, without changing the number of aisles and/or storage locations, results in a higher number of double cycles. The region of the present disclosure does not only form a "bridge" between the classic shuttle systems and the classic ASPW system, it even extends the same.

It is clear that the above explanation given for retrieval also apply for the storage at reversed direction of material flow.

LIST OF REFERENCE NUMERALS

10 Storage and picking system
12 Rack arrangement
14 Racks
16 Single racks
18 Double racks
20 Outer racks
22 Retrieval rack
24 Storage rack
26 Central racks
28 Regions
30 Outer region
32 Central region
34 Rack aisles
36 Storage and retrieval device (SRD)
37 Load-handling device (LHD)
38 Aisle-exchange unit
40 Vertical conveyor
42 Retrieval interface
44 Control device
46 Conveying system
48 Work stations
50 Goods receipt (WE)/goods issue (WA)
52 Rack compartment
54 Rack planes
56 Long side
58 Short side
60 Flow channels
62 One-plane SRD/shuttle
64 Multiple-plane SRD
66 Handling units
68 Storage direction
70 Retrieval direction
72 Rim of 28, 30, and 32
74 Conveying device
76 SRD density
78 Aisle-exchange-unit density
80 Central axis Therefore, what I claim is:

1. A storage and picking system for retrieving handling units comprising:
  a rack arrangement including a plurality of racks, which are aligned along a longitudinal direction of the system and which comprise several rack planes in a height direction of the system on top of each other, wherein the rack arrangement comprises in a transversal direction of the system a central region and two outer regions enclosing the central region in the transversal direction between each other, and wherein the rack arrangement comprises:
  a first outer rack positioned in one of the outer regions of the rack arrangement and defining a first retrieval rack, from which handling units which are to be retrieved, or articles contained therein, exit the rack arrangement in the transversal direction;
  at least one central rack positioned in the central region of the rack arrangement;
  a first rack aisle positioned in the transversal direction between the first outer rack and the central racks; and a second rack aisle positioned on a side of the central racks opposite to the first aisle in the transversal direction;

a plurality of aisle-exchange units, which are respectively configured to move the handling units in the transversal direction through one of the central racks, wherein at least one of the aisle-exchange units is assigned to each of the central racks;

a plurality of storage and retrieval devices movable horizontally in the rack aisles in the longitudinal direction and respectively comprising a load-handling device configured for transferring the handling units substantially in the transversal direction, wherein at least one of the storage and retrieval devices is provided in each of the rack aisles; and at least a first vertical conveyor, wherein each of the first vertical conveyors is connected to the first retrieval rack only, or is integrated into the first retrieval rack;

wherein the rack arrangement further comprises at least one third rack aisle, wherein each of the third rack aisles is positioned in the transversal direction between two of the central racks, which are arranged adjacent and distanced to each other in the transversal direction.

2. The system of claim 1, wherein at least two of the storage and retrieval devices, which cannot pass each other in the longitudinal direction, are provided in the first rack aisle.

3. The system of claim 1, wherein the central racks only comprise at least one of rack compartments or aisle-exchange units.

4. The system of claim 3, wherein the aisle-exchange units are integrated into the central racks.

5. The system of claim 1, wherein each of the storage and retrieval devices is a one-plane storage and retrieval device, and wherein at least one of the one-plane storage and retrieval devices is provided in each of the rack aisles at each rack plane.

6. The system of claim 1, wherein as many storage and retrieval devices as first vertical conveyors are provided in the first rack aisle.

7. The system of claim 1, wherein the rack arrangement comprises a second outer rack, which is arranged in the other of the outer regions in the transversal direction opposite to the first outer rack and which defines a second retrieval rack from which the handling units, or articles contained therein, exit the rack arrangement in the transversal direction.

8. The system of claim 1, wherein a storage-and-retrieval-device density increases in a retrieval direction.

9. The system of claim 8, wherein an aisle-exchange-unit density increases in the retrieval direction.

10. The system of claim 1, wherein an aisle-exchange-unit density increases in a retrieval direction.

11. The system of claim 1, wherein the rack compartments, as well as the load-handling device of the storage and retrieval devices, are configured for multiple-deep storing of the handling units.

12. A storage and picking system for retrieving handling units comprising:

a rack arrangement including a plurality of racks, which are aligned along a longitudinal direction of the system and which comprise several rack planes in a height direction of the system on top of each other, wherein the rack arrangement comprises in a transversal direction of the system a central region and two outer regions enclosing the central region in the transversal direction between each other, and wherein the rack arrangement comprises:

a first outer rack positioned in one of the outer regions of the rack arrangement and defining a first retrieval rack, from which handling units which are to be retrieved, or articles contained therein, exit the rack arrangement in the transversal direction;

at least one central rack positioned in the central region of the rack arrangement;

a first rack aisle positioned in the transversal direction between the first outer rack and the central racks; and a second rack aisle positioned on a side of the central racks opposite to the first aisle in the transversal direction;

a plurality of aisle-exchange units, which are respectively configured to move the handling units in the transversal direction through one of the central racks, wherein at least one of the aisle-exchange units is assigned to each of the central racks;

a plurality of storage and retrieval devices movable horizontally in the rack aisles in the longitudinal direction and respectively comprising a load-handling device configured for transferring the handling units substantially in the transversal direction, wherein at least one of the storage and retrieval devices is provided in each of the rack aisles; and at least a first vertical conveyor, wherein each of the first vertical conveyors is connected to the first retrieval rack only, or is integrated into the first retrieval rack;

the system further comprising a control device controlling a material flow of handling units to be retrieved so that handling units to be retrieved are moved substantially along the transversal direction through the rack arrangement to one retrieval interface by:

retrieving one of the handling units to be retrieved by one of the storage and retrieval devices from one of the rack compartments and subsequently delivering the same to one of the aisle-exchange units, or to one of the vertical conveyors;

moving the delivered handling unit from the one of the aisle-exchange units through the corresponding central rack for being retrieved from another one of the storage and retrieval devices and for being delivered to one of the vertical conveyors, or to another one of the aisle-exchange units in another one of the central racks; and conveying, by the one of the vertical conveyors, the delivered handling unit vertically to the retrieval interface thereof;

and so that the handling units to be retrieved are moved substantially in the transversal direction through the rack arrangement for exiting the rack arrangement via the retrieval racks.

13. The system of claim 12, wherein at least two of the storage and retrieval devices, which cannot pass each other in the longitudinal direction, are provided in the first rack aisle.

14. The system of claim 12, wherein the central racks only comprise at least one of rack compartments or aisle-exchange units.

15. The system of claim 14, wherein the aisle-exchange units are integrated into the central racks.

16. The system of claim 12, wherein each of the storage and retrieval devices is a one-plane storage and retrieval device, and wherein at least one of the one-plane storage and retrieval devices is provided in each of the rack aisles at each rack plane.

17. The system of claim 12, wherein as many storage and retrieval devices as first vertical conveyors are provided in the first rack aisle.

18. The system of claim 12, wherein the rack arrangement further comprises at least one third rack aisle, wherein each of the third rack aisles is positioned in the transversal direction between two of the central racks, which are arranged adjacent and distanced to each other in the transversal direction.

19. The system of claim 12, wherein the rack arrangement comprises a second outer rack, which is arranged in the other of the outer regions in the transversal direction opposite to the first outer rack and which defines a second retrieval rack from which the handling units, or articles contained therein, exit the rack arrangement in the transversal direction.

20. The system of claim 12, wherein a storage-and-retrieval-device density increases in a retrieval direction; and/or wherein an aisle-exchange-unit density increases in a retrieval direction.

\* \* \* \* \*